J. F. SWANK.
PUMP VALVE.
APPLICATION FILED APR. 21, 1915.
1,185,022. Patented May 30, 1916.
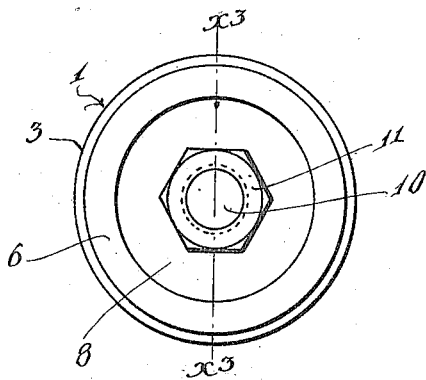
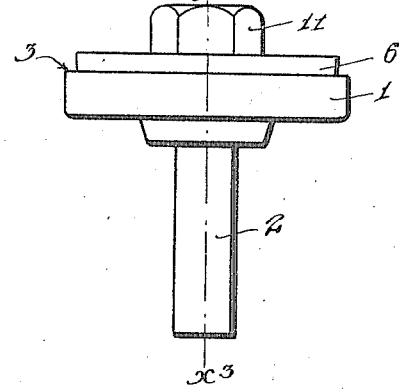
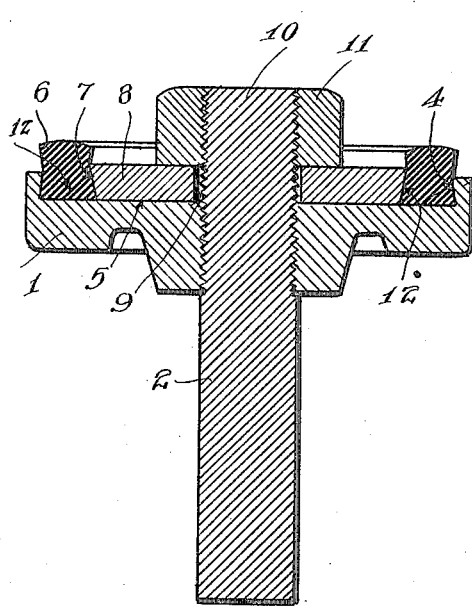
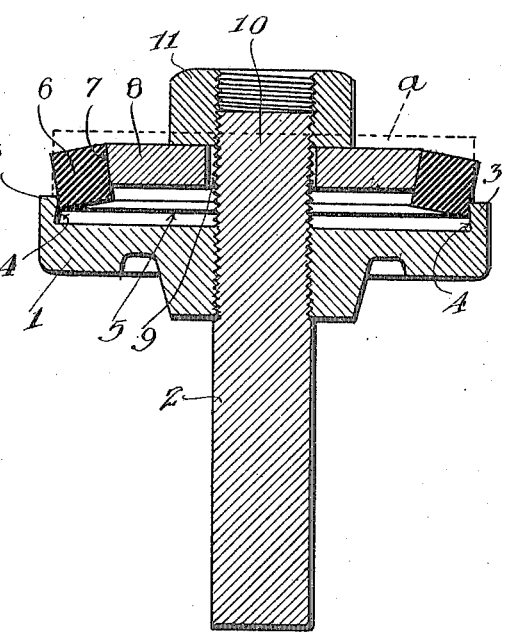
Witnesses:
Inventor
John F. Swank.
By Frederick Whyon
atty

UNITED STATES PATENT OFFICE.

JOHN F. SWANK, OF FULLERTON, CALIFORNIA, ASSIGNOR OF ONE-HALF TO CHARLES E. GERNER, OF BREA, CALIFORNIA.

PUMP-VALVE.

1,185,022.  Specification of Letters Patent.  Patented May 30, 1916.

Application filed April 21, 1915. Serial No. 22,804.

*To all whom it may concern:*

Be it known that I, JOHN F. SWANK, a citizen of the United States, residing at Fullerton, in the county of Orange and State of California, have invented a new and useful Pump-Valve, of which the following is a specification.

An object of this invention is to make provision for maximizing the wearing qualities of valves and more especially valves of the type employed in connection with mud pumps and the like in which the grit and sand has such great wearing action on the valve rings as to make it necessary to replace said rings about every two days when said rings are of the usual, so termed, hydraulic type.

Soft rubber disks have been employed instead of the hydraulic rings to minimize the wearing action of the sand and grit, but said disks are of necessity relatively expensive, and an object of this invention is to make provision whereby a soft rubber valve ring may be employed so as to get the benefits derivable from the soft rubber, and at the same time minimize the quantity of rubber employed, thus considerably reducing the cost of the valve rings.

Another object is the production of a valve having superior ring clamping means so as to insure against the ring slipping out of place, such slipping out of place being very detrimental to the valve body for the reason that, when the valve ring slips out of place, the sand and grit quickly wear away the flange of the valve, thus necessitating replacement of the valve body as well as the ring.

The accompanying drawings illustrate the invention.

Figure 1 is an inner end view of the valve. Fig. 2 is a side view of Fig. 1. Fig. 3 is an enlarged longitudinal section on line indicated by $x^3$—$x^3$, Figs. 1 and 2. Fig. 4 is a sectional view analogous to Fig. 3, excepting that the ring and disk are not fully seated.

There is provided a cylindrical valve body 1 having a suitable guide or guides, and in the instance shown in the drawings said guide is in the form of a central cylindrical stem 2 screw threaded or otherwise fastened into said body. The body 1 is provided with an annular flange 3 having an undercut inside face 4, and said flange forms the circumferential wall of a recess 5. The recess 5 accommodates an expansible compressible ring 6 preferably formed of resilient material such as soft rubber. Said ring before being forced into the recess may be of slightly larger outside diameter than the diameter of said recess, as clearly shown in dotted lines *a*, Fig. 4. The ring 6 protrudes from the recess 5 and the inside face of said ring is engaged by the undercut or beveled edge 7 of a disk 8 having a central orifice 9 to accommodate a screw threaded stud 10 which projects from the body 1 and which, in the instance shown in the drawings, is integral with the guide stem 2 and which is provided with a nut 11 seated against the disk. Thus the recessed body 1 and disk 8 together form a dovetail groove 12 to accommodate the ring 6 and the nut and disk constitute means to compress the ring into the recess and also to expand said ring against the inside face 4 of the flange 3.

To assemble the ring 6 into place, the person doing the assembling will force said ring slightly into the recess 5, as shown in Fig. 4, and he will then slip the disk 8 over the stud 10 into position so that the undercut edge 7 will engage the inside face of the ring and the outer faces of the disk and ring will be substantially flush with one another, as shown in said figure. He will then force the ring 6 and disk 8 together downward farther into the recess, and he will then apply the nut 11 to the stud 10 and turn the nut to force the disk still farther into the recess 5 to the position shown in Fig. 3, thus compressing the ring into the recess and expanding said ring against the undercut face 4 of the valve body 1. The ring 6 is thus firmly held in the dovetail groove 12 and said ring is a great deal less expensive than a rubber disk of the same diameter would be and will last for a much greater period of time than the, so termed, hydraulic ring.

What I claim is:

1. A pump valve comprising a recessed body having a flange forming the circumferential wall of the recess, the inside face of said flange being beveled inward toward the bottom of the recess, a ring in the recess, a disk in the recess, said disk having its edge beveled inward toward the bottom of the recess and toward the axis of said disk and adapted to be inserted in the ring when the ring is inserted in the recess and is spaced apart from the bottom of said recess, and means separate from the disk to force the disk toward the bottom of the recess.

2. A pump valve comprising a body having a recess surrounded by a flange, the inside face of said flange being undercut to form a beveled seat, a resilient ring normally in the form of a plain cylinder of larger outside diameter than the smallest inside diameter of the undercut flange, a disk having its edge undercut to form a beveled seat complementary to the beveled seat of the body and of substantially the same diameter as the inside diameter of the ring when said ring is partly inserted in said recess and slightly spaced from the bottom thereof, and means to simultaneously force the ring and disk tightly into the recess and hold them therein.

3. A pump valve comprising a body having a recess, a resilient ring normally in the form of a plain cylinder of larger outside diameter than the diameter of the recess, and means to force said ring into said recess and hold it there.

4. A pump valve comprising a body having a flange undercut at its inside face, a ring normally in the form of a plain cylinder, a stud extending from the body through the ring, a disk mounted on said stud, and means on the stud to hold the disk in place.

5. Two relatively movable members together forming a circular groove of dovetail cross section, a ring normally in the form of a plain cylinder seated in said groove, and means to hold said members against relative movement to hold the ring in place.

In testimony whereof, I have hereunto set my hand at Los Angeles, California, this 14 day of April, 1915.

JOHN F. SWANK.